(12) United States Patent
Furuhashi et al.

(10) Patent No.: US 6,411,625 B1
(45) Date of Patent: Jun. 25, 2002

(54) ATM-LAN NETWORK HAVING A BRIDGE THAT ESTABLISHES COMMUNICATION WITH OR WITHOUT LAN EMULATION PROTOCOL DEPENDING ON DESTINATION ADDRESS

(75) Inventors: Shingo Furuhashi; Toshio Ishizuka, both of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/032,609

(22) Filed: Feb. 27, 1998

(30) Foreign Application Priority Data

Feb. 28, 1997  (JP) ............................................. 9-045785

(51) Int. Cl.⁷ .......................... H04L 12/28; H04L 12/56
(52) U.S. Cl. ................... 370/395.53; 370/401; 370/466
(58) Field of Search ................................ 370/395, 389, 370/396, 398, 400, 401, 402, 403, 404, 405, 465, 466, 467, 395.53

(56) References Cited

U.S. PATENT DOCUMENTS

| | | | |
|---|---|---|---|
| 4,947,390 A | | 8/1990 | Sheehy |
| 5,309,437 A | | 5/1994 | Perlman et al. |
| 5,432,907 A | | 7/1995 | Picazo, Jr. et al. |
| 5,517,620 A | | 5/1996 | Hashimoto et al. |
| 5,581,552 A | * | 12/1996 | Civanlar et al. ............ 370/396 |
| 5,600,644 A | * | 2/1997 | Chang et al. ............... 370/404 |
| 5,732,071 A | * | 3/1998 | Saito et al. ................. 370/255 |
| 5,752,003 A | * | 5/1998 | Hart ........................... 709/223 |
| 5,828,665 A | * | 10/1998 | Husak ........................ 370/387 |
| 5,892,763 A | * | 4/1999 | Laraqui et al. ............. 370/395 |
| 6,144,668 A | * | 11/2000 | Bass et al. ................... 370/401 |

FOREIGN PATENT DOCUMENTS

| | | |
|---|---|---|
| JP | 8-56227 | 2/1993 |
| JP | 8-56227 | 2/1996 |
| JP | 8274804 | 10/1996 |
| JP | 8274805 | 10/1996 |
| JP | 9-8838 | 1/1997 |

OTHER PUBLICATIONS

Dimitrios N. Serpanos et al, IEEE Communications Society, ICC '93 Geneva: IEEE International Conference on Communications '93, May 23–26, 1993, "Transparent bridging support in high speed Internetworking Units" pp. 42–47. See p. 42, part 2 and the entire document.

Office Action Issued by the Japanese Patent Office Dated Oct. 13, 1998 and a Translation Thereof Nikkei Communications 1994.5.2. No. 173, p. 48.

\* cited by examiner

Primary Examiner—Douglas Olms
Assistant Examiner—Bob A. Phunkulh
(74) Attorney, Agent, or Firm—Dickstein Shapiro Morin & Oshinsky LLP

(57) ABSTRACT

In an ATM-LAN network, a number of ports of a bridge are uniquely identified by port numbers and connected to LAN segments and an ATM network. A MAC frame from a source terminal is received at a first port and buffered in a FIFO and a search is made through a memory for an entry containing the destination address of the frame. If the entry is found, the frame is forwarded onto a second port identified by a port number contained in the entry. If the entry is not found, an address resolution request is sent to a LAN emulation server via the ATM network to obtain an ATM address corresponding to the destination address of the frame. A connection setup request is sent to the ATM network to establish a virtual connection in the ATM network according to the destination ATM address. The frame is then forwarded onto the port to which the ATM network is connected.

16 Claims, 2 Drawing Sheets

ATM-LAN NETWORK HAVING A BRIDGE THAT ESTABLISHES COMMUNICATION WITH OR WITHOUT LAN EMULATION PROTOCOL DEPENDING ON DESTINATION ADDRESS

BACKGROUND OF THE INVENTION

1. Field of the Invention

The present invention relates generally to ATM-LAN networks where LAN emulation clients access to a LAN emulation server, and more specifically to a bridge for establishing communication among LAN segments or between any one of the LAN segments and an ATM network.

2. Description of the Related Art

In a known ATM-LAN network as disclosed in Japanese Laid-Open Patent Specification Hei-8-56227, each one of interconnected ATM nodes serves both ATM terminals and LAN terminals and includes a cell switching unit, a LAN emulation unit and a packet transfer unit. The LAN emulation unit has a bridging function at the level of medium access control (MAC) sublayer and the packet transfer unit has a routing function at the level of network layer. These units are connected to a transmission line via the cell switching unit. Communication between LAN terminals on different LAN segments involves the use of a LAN interface which segments a MAC frame from the source terminal into 53-byte cells and forwards them through a cell switching unit to the LAN emulation unit, where it reassembles the cells into a MAC frame for routing (bridging) at the MAC-sublayer level, appends a VCI (virtual channel identifier) to the frame, segments it again into cells and then forwards them through the cell switching unit to the destination. Therefore, a substantial amount of time is involved to process the LAN emulation protocol for bridging different LAN segments of an ATM-LAN network.

SUMMARY OF THE INVENTION

It is therefore an object of the present invention to provide an ATM-LAN network where bridged communication between LAN segments is established in a short period of time.

According to a broader aspect, the present invention provides a communication network comprising an ATM network, a plurality of LAN segments each serving a plurality of LAN emulation clients, and a bridge having a memory for storing addresses of the LAN emulation clients. The bridge receives a frame, examines its address with contents of the memory, and establishes communication between the LAN segments without using LAN emulation protocol if the frame is determined to be destined for a LAN segment connected to the bridge or establishes communication between the LAN segments via the ATM network using the LAN emulation protocol if the frame is determined to be destined for a LAN segment which is not connected to the bridge.

According to a second aspect of the present invention, there is provided a communication network comprising an ATM network, a LAN emulation server connected to the ATM network, a plurality of LAN segments each having at least one LAN emulation client, and a bridge comprising a plurality of ports uniquely identified by port numbers and connected to the LAN segments and the ATM network, a memory having a plurality of entries, a plurality of buffer means for receiving a frame from the ports, the frame containing source and destination data-link-layer addresses, and means for storing into the memory the source data-link-layer address of the frame and the port number of a first port of the plurality of ports from which the frame was received, making a search through the memory for an entry containing the destination address of the frame, forwarding the frame onto a second port of the plurality of ports identified by a port number contained in the entry if the entry is found in the memory, the second port being different from the first port, transmitting an address resolution request to the LAN emulation server via the ATM network to obtain a destination ATM address corresponding to the destination data-link-layer address if the entry is not found in the memory, transmitting a connection setup request to the ATM network to establish a virtual connection in the ATM network according to the destination ATM address, and forwarding the frame onto the port to which the ATM network is connected.

BRIEF DESCRIPTION OF THE DRAWINGS

The present invention will be described in further detail with reference to the accompanying drawings, in which.

DETAILED DESCRIPTION

Figure 1:
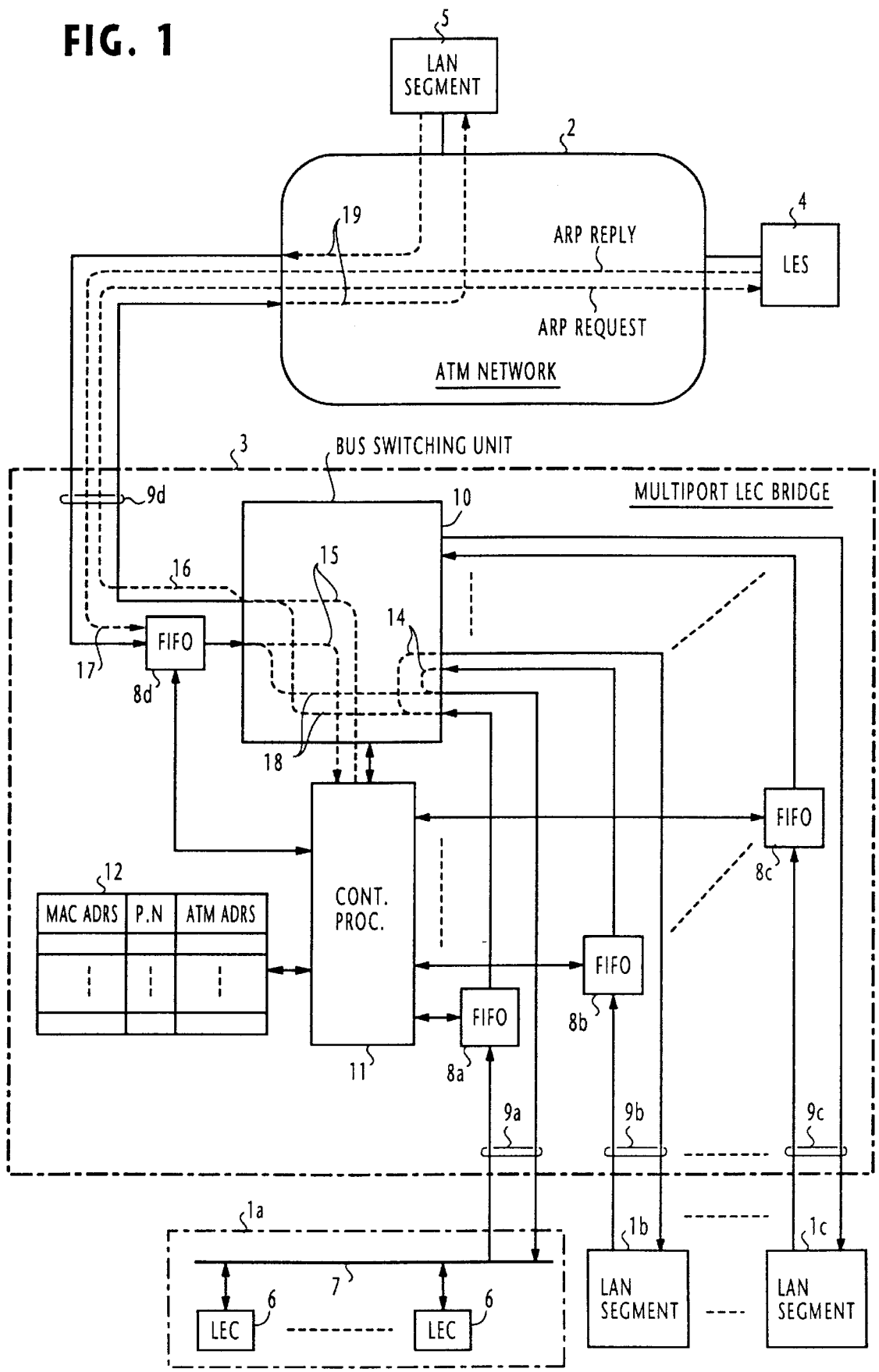
FIG. 1 is a block diagram of an ATM-LAN network using a multiport LEC (LAN emulation client) bridge of the present invention.

Referring now to FIG. 1, there is shown an ATM (asynchronous transfer mode)-LAN (local area network) network according to the present invention. The network comprises a plurality of LAN segments 1a, 1b, 1c, an ATM network 2, and a multiport LEC (LAN emulation client) bridge 3 connected to LAN segments 1 and ATM network 2. Each LAN segment 1 has a plurality of LEC (LAN emulation clients) terminals 6 connected to a common bus 7. To the ATM network 2 are connected a LAN emulation server (LES) 4 and a plurality of LAN segments. For simplicity, only one LAN segment 5 is shown attached to the ATM network 2. Similar to each LAN segment 1, the LAN segment 5 includes a plurality of LAN emulation clients.

The bridge 3 includes a plurality of FIFO (first-in-first-out) memories 8a, 8b, 8c for buffering MAC (medium access control sublayer) frames which are forwarded from the LECs 6 of each LAN segment to their respective buses and received via respective ports 9a, 9b, 9c. The bridge 3 further includes an FIFO 8d connected to the ATM network 2 via a port 9d. The output terminal of each FIFO 8 is connected to a corresponding input terminal of a bus switching unit 10 and the control terminal of each FIFO is connected to a corresponding terminal of a control processor 11. The processor 11 examines the contents of each FIFO and controls the timing at which the stored frame is forwarded from the FIFO to the bus switching unit. The bus switching unit 10 has a plurality of output terminals which are respectively connected to the buses 7 of LAN segments 1a, 1b, 1c via ports 9a, 9b, 9c as well to the ATM network 2 via port 9d.

Control processor 11 is associated with an address table 12 in which the data-link-layer addresses of LEC terminals 6 are mapped to the port numbers of their LAN segments and further to ATM addresses if the IP address is on the ATM network to prevent intra-segment traffic from being forwarded outside of the intended LAN segment and to permit communications with limited outside (ATM) terminals. Control processor 11 is further associated with the bus switching unit 10 to establish switched paths to interconnect different ports of the multiport bridge.

Figure 2:
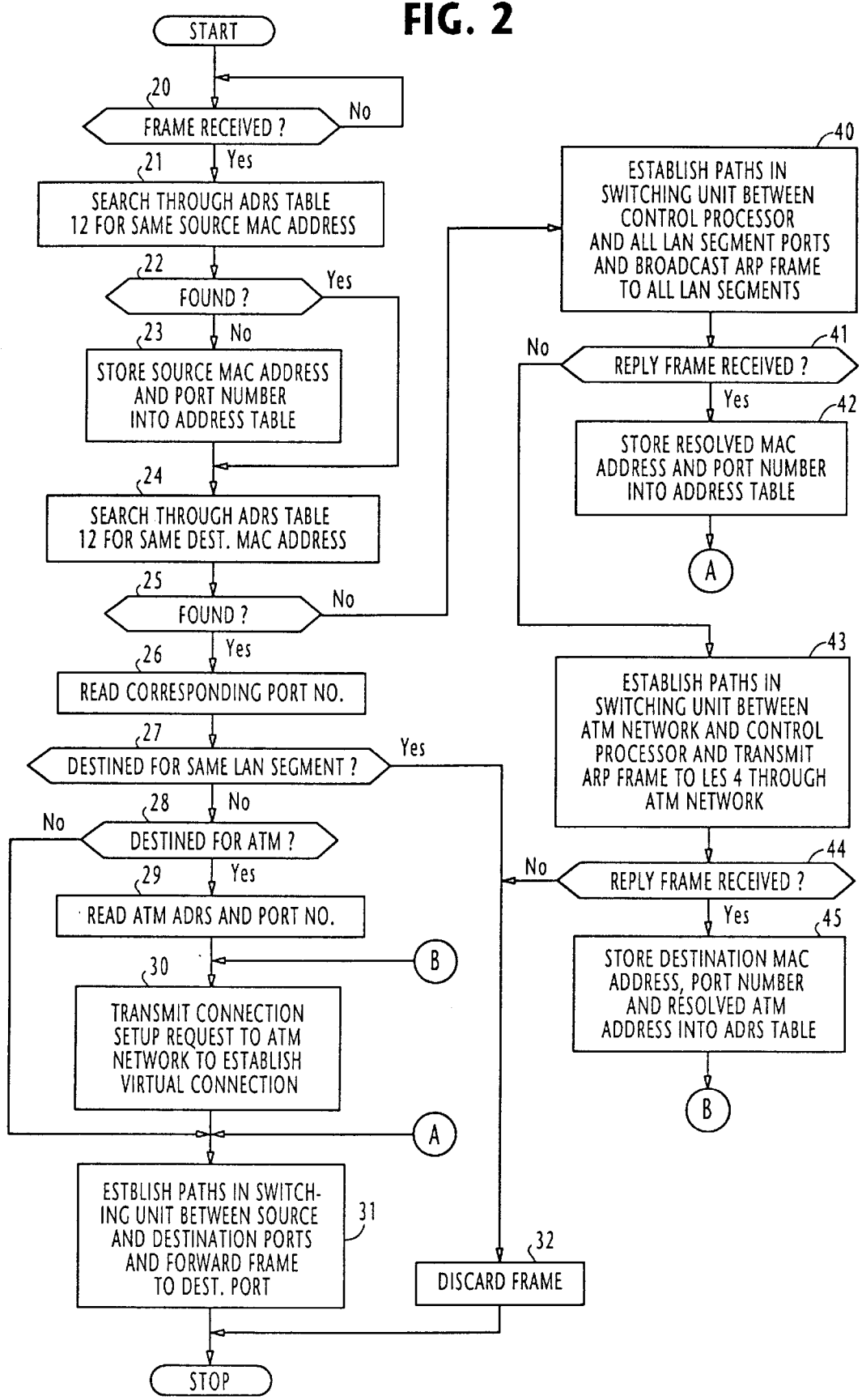
FIG. 2 is a flowchart illustrating the operation of the control processor of FIG. 1.

The operation of the control processor 11 proceeds according to the flowchart of FIG. 2.

Control processor 11 starts operating at step 20 when it receives a MAC frame from an LEC terminal. At step 21, the control processor 11 reads the source and destination address fields of the frame and makes a search through the address table 12 for an address identical to the source MAC (data link layer) address of the frame. If there is none (step 22), flow proceeds to step 23 to store the source MAC address of the frame and the port number of the port from which the frame was received into one of the entries of address table 12. If the source MAC address of the frame is found in the address table at step 22 or it is just stored in the table at step 23, flow proceeds to step 24 to make a search through the address table 12 for an entry containing the destination MAC address of the frame to determine if the same MAC address is already registered in the table 12. If such an entry is found (step 25), the control processor recognizes that the destination MAC address of the frame is already registered and that the destination terminal is on one of the LAN segments 1a, 1b, 1c, and proceeds to step 26 to read the port number contained in the entry corresponding to the destination MAC address. Flow proceeds to step 27 to determine if the destination terminal is on the same LAN segment as the source LAN segment. If so, the control processor discards the frame at step 32, and terminates the routine. Otherwise, flow proceeds to step 28 to determine if an ATM address is contained in the entry which is found to contain the destination MAC address of the frame at step 25.

If the decision is negative at step 28, it is determined that the destination terminal is on one of the LAN segments which is different from the source LAN segment, and flow proceeds from step 28 to step 31 to establish paths in the bus switching unit 10 between the source and the destination ports and forward the frame via the switching unit 10 to the destination port, and then terminates the routine.

On the other hand, if an entry containing the destination MAC address of the frame is not found in the address table 12 (step 25), it is determined that the destination is on one of the LAN segments, but its address is still not registered in the address table 12, or the destination is outside of the LAN segments and attached to the ATM network 2. In this case, flow proceeds to step 40 to establish paths in the switching unit between the control processor and all LAN segment ports and formulate and broadcast an address resolution protocol (ARP) request frame to all LAN segments, assuming that the address of the destination terminal is still not registered in the address table 12. The destination terminal responds to this request frame and returns a reply frame containing its MAC address. If a reply frame is returned from the destination terminal (step 41), the control processor stores the resolved MAC address contained in the reply frame and the port number of the port from which the reply frame was received into one of the entries of address table 12 (step 42). Step 31 is then executed to establish paths in the switching unit between the source and destination LAN segment ports and forward the frame to the destination port.

If no reply frame is returned within a specified time interval (step 41), it is determined that the destination terminal may be attached to the ATM network 2 and flow proceeds to step 43 where the control processor establishes paths in the switching unit 10 between it and the port 9d, and formulates and transmits an ARP frame to the ATM network 2 to obtain the ATM address of the destination according to the LANE (LAN emulation) protocol. The ARP frame is transmitted in 53-byte ATM cells through the ATM network to the LES 4, where the cells are reassembled and analyzed by LES 4 to look up its map to find an ATM address corresponding to the data-link-layer address of the destination. If the ATM address is found, the LES 4 returns a reply frame with this ATM address to the control processor 11.

Following the transmission of the ARP frame (step 43), the control processor 11 proceeds to step 44 to determine if an ARP reply frame is received from the LES 4 within a specified time interval. If not, the controller 11 recognizes that the LES 4 has failed to find the ATM address and proceeds from step 44 to step 32 to discard the frame and terminate the routine. If an ARP reply frame is received (step 44), the control processor stores the ATM address of the destination ATM terminal, the corresponding destination MAC address of the frame and the port number of port 9d into one of the entries of address table 12 (step 45).

The control processor then proceeds to step 30 to formulate a connection setup frame using the resolved ATM address and transmit it to the ATM network via the switching unit 10 and then clears the paths in the switching unit 10 between port 9d and the control processor 11. In response to the connection setup frame, the ATM network establishes a virtual connection between the bridge 3 and the destination client on LAN segment 5.

Control processor 11 proceeds to step 31 to establish paths in the switching unit 10 between the source LAN segment and port 9d and forwards the frame to the destination ATM terminal over the virtual connection set up in the ATM network 2. When all frames stored in the FIFO of the source terminal are forwarded, flow proceeds to the end of the routine.

Meanwhile, if an ATM address is once obtained for a given MAC address by the ATM address resolution subroutine (steps 43–45 and 30) described above, the decision at step 28 is affirmative and the control processor proceeds to step 29 to read the ATM address and the port number of port 9d from the entry of the table 12 which was found to be present at step 25. At step 30, the control processor establishes a virtual connection to the ATM terminal using the stored ATM address and then forwards the frame to port 9d (step 31).

If one of LEC terminals of LAN segment 1a wishes to communicate with a terminal on LAN segment 1b and sends out a frame on its bus 7, the frame is stored in the associated FIFO 8a. The control processor 11 checks the source and destination address fields of the frame with the contents of table 12. If the control processor determines that the source and destination addresses are already stored in the address table 12, it identifies the port number of the destination LAN segment 1b and establishes paths 14 in the bus switching unit 10 for interconnecting ports 9a and 9b and forwards the frame from FIFO 8a to the destination LAN segment 1b.

If the control processor determines that the destination address is not found in the address table, it broadcasts an ARP frame containing the source and destination addresses to all LAN segments attached to the multiport bridge 3. In this case, the destination terminal is still not registered in the address table. Therefore, the destination terminal on LAN segment 1b responds to the ARP frame by returning a reply frame to the control processor 11 to communicate its address. The communicated address and the corresponding port number are stored in the address table to be used later to establish a communication without broadcasting an ARP frame.

If the terminal of the source LAN segment 1a wishes to communicate with a client on LAN segment 5 whose ATM address is still unknown and sends a frame containing the MAC address of the destination, no reply frame will be returned in response to the broadcast ARP request frame and the decision at step 41 is negative. The control processor thus proceeds to step 43 to establish paths 15 in the switching unit 10 between it and port 9d and sends an ARP frame to the ATM network 2 via a path 16, containing the MAC address of the LAN segment 5 (step 43). This ARP request frame propagates through the ATM network to the LES 4 and a reply frame is returned to the bridge 3 via a path 17 and received by the control processor 11 through FIFO 8d, with the decision at step 44 becoming affirmative Using the resolved ATM address of the destination terminal, the control processor sends a connection setup frame to the ATM network 2 via path 16 to establish paths (virtual connections) 19 in the ATM network 2 to the destination LAN segment 5 (step 46). The control processor 11 then establishes paths 18 in the bus switching unit 10 for interconnecting ports 9a and 9d and forwards the frame from FIFO 8a to the LAN segment 5 (step 31). When the reply frame was received at step 44, the network and ATM addresses of the destination client on LAN segment 5 and the port number of port 9d are stored in the address table 12 (step 45) to be used later to establish connections in the ATM network without using the address resolution subroutine. Note that aging technique may be used to update the contents of the address table 12.

What is claimed is:

1. A communication network comprising:
   an ATM network;
   a LAN emulation server connected to the ATM network;
   a plurality of LAN segments, each having at least one LAN emulation client; and
   a bridge comprising a plurality of ports uniquely identified by port numbers and connected to the LAN segments and the ATM network, a memory having a plurality of entries, a plurality of buffer means for receiving a frame from said ports, said frame containing source and destination data-link-layer addresses, and control means for storing into one of the entries of said memory the source data-link-layer address of the frame and the port number of a first port of said plurality of ports from which the frame was received, making a search through the memory for an entry containing the destination data-link-layer address of the frame, forwarding the frame onto a second port of said plurality of ports identified by a port number contained in the entry if the entry is found in said memory, said second port being different from said first port, transmitting an address resolution request to the LAN emulation server via said ATM network to obtain a destination ATM address corresponding to said destination data-link-layer address if said entry is not found in said memory, transmitting a connection setup request to the ATM network to establish a virtual connection in the ATM network according to the destination ATM address, and forwarding the frame onto the port to which the ATM network is connected.

2. A communication network as claimed in claim 1, wherein said control means is arranged to:
   broadcast an address resolution request to all of said ports to obtain a data-link-layer address from a third port of said plurality of ports if said entry is not found in said memory; and
   store the obtained data-link-layer address and the port number of said third port into one of the entries of said memory.

3. A communication network as claimed in claim 1, wherein said control means is arranged to store into one of the entries of said memory said destination ATM address, the corresponding destination data-link-layer address and the port number of the port to which the ATM network is connected.

4. A communication network as claimed in claim 3 wherein said control means is further arranged to:
   transmit a connection setup request to the ATM network if said entry is found in said memory, using said destination ATM address, to establish a virtual connection in said ATM network; and
   forward the frame to the port to which the ATM network is connected.

5. A method of communication for an ATM-LAN network which includes an ATM network, a LAN emulation server connected to the ATM network, a plurality of LAN segments, each having at least one LAN emulation client, a plurality of ports connected to the LAN segments and the ATM network, and a memory having a plurality of entries, said ports being uniquely identified by port numbers, the method comprising the steps of:
   a) receiving a frame from a first port of said plurality of ports, said frame containing source and destination data-link-layer addresses;
   b) storing the source data-link-layer address of the frame and the port number of said first port into one of the entries of said memory;
   c) making a search through the memory for an entry containing the destination data-ink-layer address of the frame;
   d) if said entry is found, forwarding the frame onto a second port of said plurality of ports identified by a port number contained in said entry, said second port being different from said first port;
   e) if said entry is not found, transmitting an address resolution request to the LAN emulation server via said ATM network to obtain a estimation ATM address corresponding to said destination MAC address;
   f) transmitting a connection setup request to the ATM network to establish a virtual connection in the ATM network according to the estimations ATM address;
   g) forwarding the frame onto the port to which the ATM network is connected; and
   h) repeating the steps (a) to (g).

6. The method of claim 5, further comprising the steps of:
   broadcasting an address resolution request to all of said ports to obtain an address from a third port of said plurality of ports if said entry is not found in said memory by the step (c); and
   storing the obtained data-link-layer address and the port number of said third port into one of the entries of said memory and forwarding the frame onto said third port.

7. The method of claim 5, wherein the step (e) further comprises the step ($e_1$) of storing into one of the entries of said memory said destination ATM address, the corresponding destination data-link-layer address and the port number of the port to which the ATM network is connected.

8. The method of claim 7 further comprising the steps of:
   if said entry is found in said memory by the step (c) when the step (c) is performed again after the step ($e_1$), transmitting a connection setup request to the ATM network, using the destination ATM address stored in said entry, to establish a virtual connection in said ATM network; and forwarding the frame to the port to which the ATM network is connected.

9. A communication system comprising:

an ATM network;

a plurality of LAN segments, each LAN segment serving a plurality of LAN emulation clients; and a bridge, the bridge being comprised of:
- a first communication port connected to the ATM network;
- a plurality of further communication ports, each of the further communication ports being connected respectively to one of the plurality of LAN segments;
- a memory for storing addresses of LAN emulation clients; and
- a control processor which is selectively operable to establish communication between LAN emulation clients not connected to the same one of the plurality of LAN segments; the control processor being further operable:
  - to compare a destination address contained in an incoming frame with contents of the memory;
  - to establish communication between the originating and destinations LAN emulation clients through the bridge without using LAN emulation protocol if the frame originated on one of the plurality of LAN segments, and is destined for a different one of the plurality of LAN segments; or
  - to establish communication between the originating LAN emulation client and the ATM network through the bridge using the LAN emulation protocol if the frame is determined not to be destined for one of the plurality of LAN segments.

10. A communication system comprising:

a first communication network operating under a first set of protocols;

a plurality of second communication networks each serving at least one communication client and operating under a second set of protocols; and a switching device, the switching device being comprised of:
- a first uniquely identified communication port connected to the first communication network, and a plurality of further uniquely identified communication ports, each of the further communication ports being connected to one of the plurality of second communication networks;
- a memory for storing communication client address information and the port identifier associated with the second communication network serving the respective communication clients;
- input circuitry for receiving data from the second communication networks through the communication ports, the data including the address of a source communication client at which the data originated, and the address of a destination communication client to which the data is directed;
- a control processor which is selectively operable to establish communication between a source communication client and a destination communication client not connected to the same one of the second communication networks, the control processor being further operable:
  - to compare the destination address information of the received data with address information stored in the memory;
  - to establish communication through the switching device without using the first communication protocol if the source and destination communication clients are served by different ones of the second communication networks or
  - to establish communication through the switching device and the first communication network using the first communication protocol if the source and destination communication clients are not both served by ones of the plurality of second communication networks.

11. A communication system as claimed in claim 10, in which the control processor is operative to broadcast an address resolution request to all of the ports if address information for the destination communication client is not found in the memory; and and is responsive to a reply to the address resolution request to store the obtained address information and the port identifier of the port associated with the communication network serving the destination communication client in the memory.

12. A communication system as claimed in claim 10, in which at least one additional communication network operating under the second communication protocol and serving at least one additional communication client is connected to the first communication network, and in which the control processor is operative to store in the memory information to permit communication to be established between one of the communication clients serviced by one of the plurality of communication networks, and a communication client served by the additional communication network.

13. A communication network as claimed in claim 12, in which the control processor is responsive to the destination communication client being served by the additional communication network to transmit a connection setup request to the first network to establish a virtual connection in said first network; and to forward the data from the source communication client to the port to which the first network is connected.

14. A method of communication for a communication system having a first communication network which operates under a first communication protocol, a plurality of second communication networks, each serving at least one communication client, and operating under a second communication protocol, a switching device having a first uniquely identified communication port connected to the first communication network, and a plurality of further uniquely identified communication ports, each of the further communication ports being connected to one of the plurality of second communication networks, at least one additional communication network operating under the second communication protocol connected to the first communication network, and serving at least one additional communication client, and a memory for storing communication client address information and the port identifier associated with the respective second communication networks, the destination address according to the first communication protocol of communication clients served by the additional communication network, and the port identifier of the first communication network, the method comprising the steps of:

receiving data from one of the second communication networks through the associated communication port, the data including address information for a source communication client at which the data originated, and address information for a destination communication client to which the data is directed;

comparing the destination address information of the received data with address information stored in the memory; and establishing communication between source and destination communication clients through the switching device if the source and destination communication clients are not connected to the same one of the second plurality of communication networks, communication being established using only the second communication protocol if the source and destination communication clients are both served by different ones of the second communication channels or through the switching device and first communication network using the first communication protocol if the source and destination communication clients not both served by ones of the plurality of second communication networks.

15. The method of claim 14, further including the step of:

broadcasting an address resolution request to all of the ports if the address information for the destination communication emulation client is not found in the memory; and and responding to a reply to the address resolution request to store in the memory, the obtained address information and the associated port identifier for the destination communication client.

16. The method of claim 14, further including the step of transmitting a connection setup request to the first communication network to establish a virtual connection in the first communication network, and forwarding the data from the source communication client to the port to which the first communication network is connected, if the destination communication client is identified as one served by the additional communication network.

* * * * *